United States Patent [19]
Daher

[11] Patent Number: 5,327,254
[45] Date of Patent: Jul. 5, 1994

[54] METHOD AND APPARATUS FOR COMPRESSING AND DECOMPRESSING IMAGE DATA

[76] Inventor: Mohammad A. Daher, 2723 - 6 Dorchester Pl., Charlotte, N.C. 28209

[21] Appl. No.: 838,560

[22] Filed: Feb. 19, 1992

[51] Int. Cl.⁵ .......................... H04N 7/12; H04N 11/02
[52] U.S. Cl. .................................. 358/426; 358/261.1; 358/428
[58] Field of Search ............... 358/133, 135, 136, 137, 358/138, 426, 427, 428, 261.1, 261.2, 261.3, 261.4, 262.1, 430, 431, 432; 375/122

[56] References Cited
U.S. PATENT DOCUMENTS

| | | | |
|---|---|---|---|
| 4,369,463 | 1/1983 | Anastassion et al. | 358/135 |
| 4,488,174 | 12/1984 | Mitchell et al. | 358/136 |
| 4,870,695 | 9/1989 | Gonzales et al. | 358/135 X |
| 5,159,449 | 10/1992 | Allmendinger | 358/136 |
| 5,184,218 | 2/1993 | Grerdes | 358/133 |

Primary Examiner—Bentsu Ro
Attorney, Agent, or Firm—Ralph H. Dougherty

[57] ABSTRACT

Apparatus for compressing and decompressing image data having rows and columns of pixels is disclosed. Compression component of the apparatus includes a mechanism for storing the image data and a mechanism for processing the image data. Processing mechanism includes a mechanism for resizing the image data into resized image data and a mechanism for compressing the resized image data at least once, thereby creating compressed image data. The resizing mechanism includes a mechanism for selecting at least one row from the image data for inclusion in the resized image data, a mechanism for selecting at least one pixel within each selected row for inclusion in the resized image data. Inverse decompression component of the apparatus is also disclosed. Method for compressing and decompressing image data having rows and columns of pixels is disclosed. A computer program product which contains encoded instructions for performing the invented method is also disclosed.

30 Claims, 8 Drawing Sheets

|   | 1 | 2 | 3 | 4 | 5 | 6 | 7 | 8 |   |
|---|---|---|---|---|---|---|---|---|---|
| 1 | * | * | * | * | * | * | * | * | IMAGE DATA |
| 2 | * | * | * | * | * | * | * | * | |
| 3 | * | * | * | * | * | * | * | * | |
| 4 | * | * | * | * | * | * | * | * | ← 12 |
| 5 | * | * | * | * | * | * | * | * | |
| 6 | * | * | * | * | * | * | * | * | |
| 7 | * | * | * | * | * | * | * | * | |
| 8 | * | * | * | * | * | * | * | * | |

16, 14, 18 label the first column.

|   | 1 | 2 | 3 | 4 | 5 | 6 | 7 | 8 |   |
|---|---|---|---|---|---|---|---|---|---|
| 1 |   |   |   |   |   |   |   |   |   |
| 2 | * |   | * |   | * |   | * |   | RESIZED |
| 3 |   |   |   |   |   |   |   |   |   |
| 4 | * |   | * |   | * |   | * |   | ← 22 |
| 5 |   |   |   |   |   |   |   |   |   |
| 6 | * |   | * |   | * |   | * |   |   |
| 7 |   |   |   |   |   |   |   |   |   |
| 8 | * |   | * |   | * |   | * |   |   |

|   | 1 | 2 | 3 | 4 | 5 | 6 | 7 | 8 |   |
|---|---|---|---|---|---|---|---|---|---|
| 1 |   |   |   |   |   |   |   |   |   |
| 2 | *' |   | *' |   | *' |   |   |   | COMPRESSED |
| 3 |   |   |   |   |   |   |   |   |   |
| 4 | *' |   | *' |   | *' |   |   |   | ← 24 |
| 5 |   |   |   |   |   |   |   |   |   |
| 6 | *' |   | *' |   | *' |   |   |   |   |
| 7 |   |   |   |   |   |   |   |   |   |
| 8 |   |   |   |   |   |   |   |   |   |

|   | 1 | 2 | 3 | 4 | 5 | 6 | 7 | 8 |   |
|---|---|---|---|---|---|---|---|---|---|
| 1 |   |   |   |   |   |   |   |   |   |
| 2 | *' |   | *' |   | *' |   | *' |   | DECOMPRESSED |
| 3 |   |   |   |   |   |   |   |   |   |
| 4 | *' |   | *' |   | *' |   | *' |   | ← 26 |
| 5 |   |   |   |   |   |   |   |   |   |
| 6 | *' |   | *' |   | *' |   | *' |   |   |
| 7 |   |   |   |   |   |   |   |   |   |
| 8 | *' |   | *' |   | *' |   | *' |   |   |

|   | 1 | 2 | 3 | 4 | 5 | 6 | 7 | 8 |   |
|---|---|---|---|---|---|---|---|---|---|
| 1 | *' | *' | *' | *' | *' | *' | *' | *' | INVERSE RESIZED |
| 2 | *' | *' | *' | *' | *' | *' | *' | *' |   |
| 3 | *' | *' | *' | *' | *' | T  | *' | *' |   |
| 4 | *' | *' | *' | *' | L  | M  | R  | *' |   |
| 5 | *' | *' | *' | *' | *' | B  | *' | *' | ← 22' |
| 6 | *' | *' | *' | *' | *' | *' | *' | *' |   |
| 7 | *' | *' | *' | *' | *' | *' | *' | *' |   |
| 8 | *' | *' | *' | *' | *' | *' | *' | *' |   |

METHOD AND APPARATUS FOR COMPRESSING AND DECOMPRESSING IMAGE DATA

BACKGROUND OF THE INVENTION

1. Field of the Invention

The present invention relates to image processing, and more particularly, to a method and apparatus for compressing and decompressing image data.

2. Description of Related Art

Image processing, or picture processing, refers to a variety of techniques for manipulating pictorial information with a computer. Typically, pictorial information is collected by an analog scanning device, such as a camera or optical scanner, and input to the computer by converting the analog signals to digital signals. The analog-to-digital conversion process results in the creation of a set of numbers representing the shape and various attributes of the image.

The type of device used by computers to display images is typically a cathode-ray tube (CRT). A CRT is a device based on similar technology as that employed in television sets. Modern day CRTs typically include the capability to adjust visual attributes such as contrast and color. The resolution capability of a CRT can range from high (e.g., specialized CRTs used in film making can display as many as nine million pixels per screen), to somewhat low (e.g., 64,000 in typical computer monitor). Higher resolution capability translates into sharper, clearer images.

A digital "picture" or "image" includes elements referred to as "dots," "points" "picture elements," "pels," or "pixels." The value of an element is typically encoded as an n-bit binary number which indicates brightness (or gray level) and/or color attributes, where the value of n varies depending upon how much information is desired concerning an individual pixel. Thus, for example, in order to represent a 500×500 pixel image, where each pixel is represented by an 8-bit binary number, 2,000,000 bits of information would need to be stored. Fortunately, most digital images include redundant information that can be compressed without loss of information.

One compression technique involves replacing frequently occurring gray levels, or blocks of gray levels, with short codes and infrequently occurring gray levels with longer codes. Another technique relies on storing the differences between the pixel values of two adjacent lines (or columns) rather than the pixel values of the lines (or columns) themselves. Yet another technique is to represent the image by the positions (or lengths) of runs of constant gray level, or more generally, to specify the positions and shapes of regions of constant gray level.

Compression techniques in which the compressed image can be decompressed into the exact original image are referred to as "lossless" techniques, since no information is lost in the decompression process. "Lossy" compression techniques involve approximation techniques in which information is discarded in favor of reduced storage requirements. The digitization process itself is a process of approximation based on spatial sampling and gray-level quantization of a given real time image. Because of the limitations of the human visual system, lossy techniques often permit images to be displayed without any difference between the original being perceptible by the viewer.

Presently, one of the most frequently used digital image compression techniques is the Joint Photographic Experts Group (JPEG) technique. The technique is described in the International Standards Organization Committee Draft document ("Draft"), ISO/IEC CD 10918-1, which is specifically incorporated herein. JPEG is an international standards group whose goal has been to develop a general-purpose international standard for the compression of continuous-tone (gray scale or true color) digital images. A portion of the standard, referred to as the Baseline Sequential Process, has been implemented in hardware form by C-Cube Microsystems in their C-Cube CL550 JPEG Image Compression Processor. The CL550 is described in the C-Cube CL550 TM JPEG Image Compression Processor, Preliminary Data Book, August 1991, which is specifically incorporated herein. As used herein, the term "JPEG Process" shall mean the JPEG Baseline Sequential Process, whether implemented in a computer hardware or computer software form.

The JPEG Process is a lossy technique in which there is a limit on the amount of compression that can be accomplished prior to the image quality becoming unacceptably poor. One reason the image becomes unacceptable is because the technique results in a tiling (blocking) effect which becomes visible on the screen. Beyond certain compression ratios, the JPEG Process may also result in degradation of color quality.

The details of the JPEG Process are discussed in the Draft and an exhaustive description of the process is unnecessary for understanding the present invention. In general, the Process involves three steps (a) a Discrete Cosine Transformation ("DCT"); (b) a Coefficient Quantization; and (c) a Lossless Compression.

The DCT step converts spatial information into frequency information in a lossless manner. An inverse DCT step converts frequency information into spatial information. The DCT step is performed on an N×N matrix of pixels and results in the creation of an N×N matrix of frequency coefficients. The JPEG standard calls for an 8×8 matrix in DCT calculations and it is this constraint which results in a disadvantageous tiling effect on displayed images beyond certain compression ratios. The tiling effect becomes apparent at a compression ratio of approximately 20:1.

The Coefficient Quantization step maps the DCT output matrix into a compressed quantization matrix. The quantization stage results in loss of information and is therefore the "lossy" phase of the JPEG Process. The amount of lost information may be regulated by setting a "quality factor" in connection with the quantization stage which typically ranges in value from 1 to 25. A low quality factor equates to low compression ratios and high picture quality, whereas a high quality factor equates to high compression ratios and low picture quality. The net effect of the quantization stage is "zero out" a number of the N×N entries of the DCT output matrix. Zero entries may then be handled in a uniform and compact manner resulting in compression of the image information.

The Lossless Compression step of the JPEG Process compresses the quantization matrix without loss of information. The precise manner of the compression may vary with the implementer of the JPEG standard. The basic steps are to convert the DCT coefficient at position 0,0 in the matrix to a relative value, arrange the coefficients in a "zig-zag sequence" and "Entropy Coding" of the coefficients. These steps are discussed in more detail in the Draft, and need not be further considered here.

The three JPEG Process compression steps have inverse counterparts for decoding a compressed image into a decompressed image.

| U.S. Pat. No. | Expires | Inventor | Title |
| --- | --- | --- | --- |
| 4,224,481 | 09-23-1997 | Russell | COMPRESSION AND EXPANSION CIRCUITRY FOR A RECORDING AND PLAYBACK SYSTEM |
| 4,320,488 | 03-16-1999 | Russell | RECORDING AND PLAYBACK SYSTEM |
| 4,495,609 | 01-22-2002 | Russell | RECORDING AND PLAYBACK SYSTEM |
| 4,672,443 | 06-09-2004 | Dischert | COPATIBLE WIDE SCREEN TELEVISION SYSTEM WITH IMAGE COMPRESSION EXPANDER |
| 4,730,215 | 03-08-2005 | Jose | COMBATIBLE WIDE SCREEN TELEVISION SYSTEM WITH VARIABLE IMAGE COMPRESSION/EXPANSION |
| 4,899,394 | 02-06-2007 | Lee | APPARATUS AND METHOD FOR IMAGE COMPRESSION |
| 4,196,448 | 04-01-1997 | Whitehouse | TV BANDED REDUCTION SYSTEM USING A HYBRID DISCRETE COSINE DPCM |
| 4,607,290 | 08-19-2003 | Murakami | IMAGE INFORMATION FILING APPARATUS |
| 4,685,141 | 08-04-2004 | Hoque | METHOD AND SYSTEM FOR FINDING IMAGE DATA ASSOCIATED WITH THE MONETARY AMOUNT ON FINANCIAL DOCUMENTS |
| 4,716,453 | 12-29-1997 | Pawelski | DIGITAL VIDEO TRANSMISSION SYSTEM |
| 4,783,834 | 11-08-2005 | Anderson | SYSTEM FOR CREATING TRANSPOSED IMAGE DATA FROM A RUN END OR RUN LENGTH REPRESENTATION OF AN IMAGE |
| 4,885,786 | 12-05-2006 | Anderson | METHOD FOR ENLARGING AN IMAGE STORED IN RUN REPRESENTATION FORM |
| 4,929,937 | 05-29-2007 | Ara | CIRCUIT FOR GENERATING IMAGE SIGNAL |
| 4,931,984 | 05-05-2007 | Ny | FILE DATA RETRIEVING SYSTEM USING RETRIEVAL-USE-IMAGE DATA |
| 5,034,817 | 07-23-2008 | Everett | RECONFIGURABLE VIDEO LINE DIGITIZER AND METHOD FOR STORING PREDETERMINED LINES OF A COMPOSITE VIDEO SIGNAL |
| 5,040,233 | 08-13-2008 | Davy | DATA COMPRESSION BY DISCARDING PORTIONS OF DATA |
| 5,048,096 | 09-10-2008 | Beato | BI-TONAL IMAGE NON-TEXT MATTER REMOVAL WITH RUN LENGTH AND CONNECTED COMPONENT ANALYSIS |

The Russell patents ('481, '488, and '609) all generally relate to recording and playback systems, typically for use in connection with television broadcasting. The patents are related to one another and share quite a lot of common information. They are included for informational purposes since they each disclose "electronic means" wherein data is compressed while recording into lines and then expanded upon readout.

Dischert et al. and Jose et al. both relate to compression/expansion systems for use in connection with wide screen televisions. Both patents generally relate to "squeezing" the left and right edges of a wide screen image in order to make the image compatible with conventional television receivers. Pixels are deleted in accordance with defined pixel deletion patterns.

In general, Lee involves the identification of text and graphic zones within an image, and the compression of the identified text zones. Graphic zones are not compressed.

Whitehouse relates to a TV bandwidth reduction system using a hybrid discrete cosine transformer and a differential pulse modulator.

Murakami relates to an image information filing apparatus in which documents are recorded as image information on optical disks.

Hoque relates to a method and system which facilitate the processing of financial documents in banking systems.

Anderson ('834) relates to the printing and other processing of binary images, and more particularly to systems in which the images are comprised of non-coded digital information in the form of vectors of run lengths or run end positions representing lines of raster bits arranged in a given scan format or direction. Anderson ('786) relates to binary digital image processing methods and more particularly to improved methods for enlarging binary image data stored in run representation form.

Ara relates to an image signal-generating circuit which horizontally compresses dots which form an image pattern.

Ny relates to a file data retrieving system, and in particular to a file data retrieving system which can be suitably applied to a microcomputer system having a data filing function, such as electronic filing system and a work station.

Everett, Jr. relates to the field of image processing, and more particularly to digitally storing one or more selected scan lines from a composite video signal in real time.

Davy relates to methods and apparatus for modifying a digital representation of an image in which the digital data defines the content of pixels of the image.

Beato relates to pre-processing devices which remove non-text material from a text image for optical text character recognition systems which are capable of processing only text images.

Pawelski relates to apparatus for processing of component high-quality video signals at the transmitter and at the receiver of a video transmission system, and particularly concerns a differential pulse code modulation encoder and a decoder for such system.

The present invented method, apparatus and article of manufacture differ from the related art by, among other things, employing unique resizing and pixel averaging components.

SUMMARY OF THE INVENTION

The invented apparatus for compressing and decompressing image data having rows and columns of pixels includes a compression component and a decompression component. The compression component of the apparatus includes a mechanism for storing the image data and a mechanism for processing the image data. The processing mechanism includes a mechanism for resizing the image data into resized image data and a mechanism for compressing the resized image data at least once, thereby creating compressed image data. The resizing mechanism includes a mechanism for choosing at least one row from the image data for inclusion in the resized image data, and a mechanism for choosing at least one pixel within each selected row for inclusion in the resized image data. An inverse decompression component, which includes a pixel averaging mechanism, is also provided.

The invented method for compressing and decompressing image data having rows and columns of pixels includes resizing, inverse resizing (with pixel averaging), compressing, and decompressing steps.

The inverted computer program product, which contains encoded instructions for performing the invented method, includes resizing, inverse resizing (with pixel averaging), compressing, and decompressing means.

OBJECTS OF THE INVENTION

The principal object of the invention is to provide a method, apparatus, and article of manufacture directed to compressing and decompressing image data.

A further object of this invention to provide a method and apparatus for compressing image data which is an improvement on the JPEG Process.

A further object of this invention to provide a method and apparatus for compressing an image to a smaller file size which does not result in unacceptable degradation of the decompressed image.

Another object of this invention to provide a method and apparatus for compressing image data which can then be electronically stored, and/or transmitted to remote locations, in a more efficient and less expensive manner than heretofore available.

A further object of this invention to provide a method and apparatus for compressing an image which may be employed with either still frame images or motion video images.

Another object of this invention to provide a computer program product directed to compressing and decompressing image data which may be employed in lieu of dedicated computer hardware components.

BRIEF DESCRIPTION OF THE DRAWINGS

The foregoing and other objects will become more readily apparent by referring to the following detailed description and the appended drawings in which:

FIG. 5 is a flow diagram of the invented method for compressing and decompressing image data.

DETAILED DESCRIPTION

Figure 1:
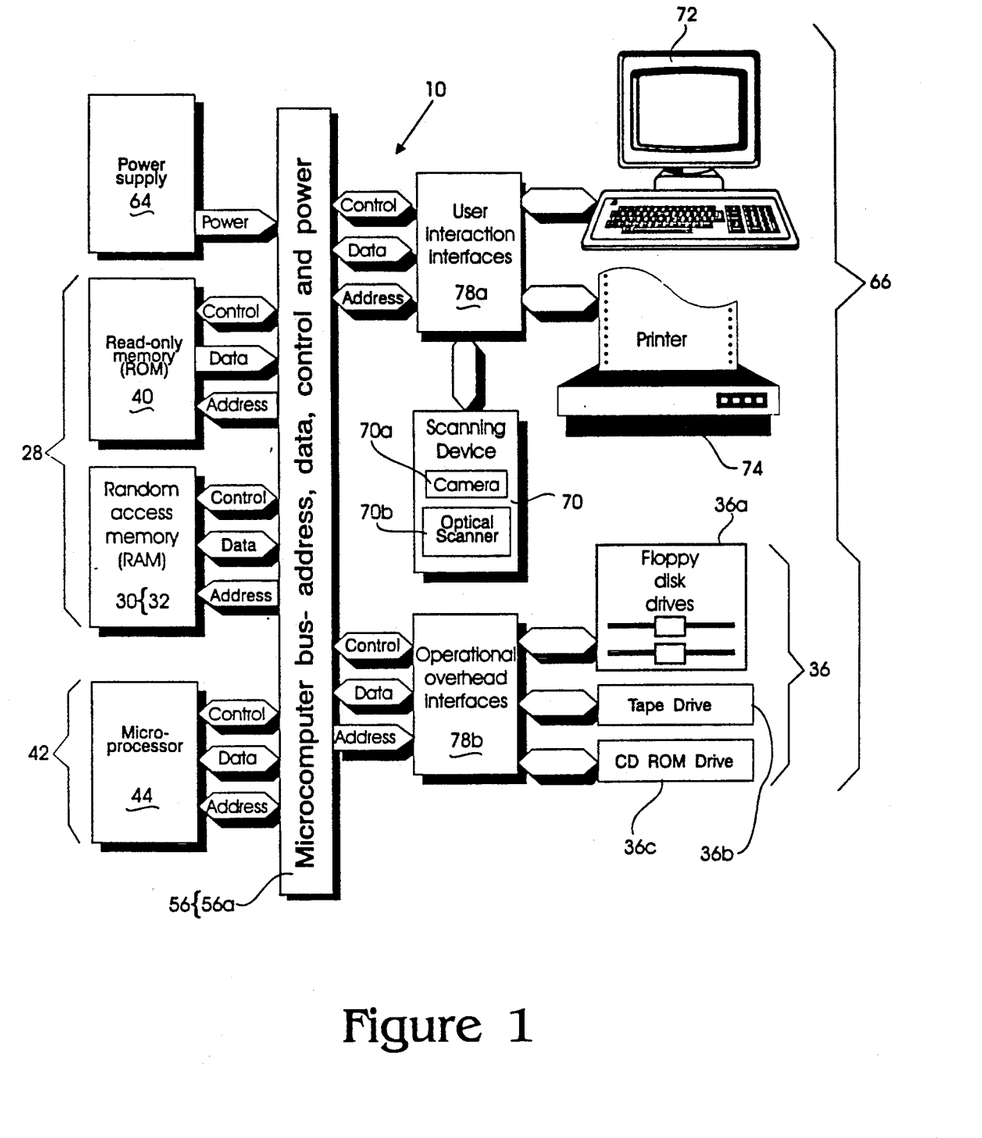
FIG. 1 is a flow diagram of the invented apparatus for compressing and decompressing image data.

Referring now to the drawings, and particularly to FIG. 1, there is shown the invented apparatus 10 for compressing and decompressing image data 12 having rows 16 and columns 18 of pixels 14. The apparatus 10 includes means 28 for storing data, hereafter "storage" and means 42 for processing data, hereafter "processor" Data may take the form of processing instructions to the processor 42 or non-instructional data, such as image data 12. As used herein, the term "apparatus" means an electric or electronic device (e.g., a computer) for governing in some programmable and predetermined way the power delivered to one or more ancillary devices.

Means 56 for communicating information between the processor and the storage, such as a microcomputer bus 56a, is provided. The bus 56a enables address, data, and control signals to be communicated between the various components of the apparatus 10 over corresponding address 58, data 60, and control 62 lines. A power supply 64 coupled to the bus 56a supplies power to the apparatus 10.

Means 66 for input and output (I/O) is also provided. I/O means 66 includes various peripheral devices, such as scanning devices 70, display devices 72, printers 74, and secondary storage access means 36, which interact with other apparatus components through interface means 78a, 78b which connect to the bus 56a.

Storage 28 includes primary storage 30, such as system RAM 32. Primary storage 30 may include special purpose video storing means, such as a video RAM device or a bidirectional first-in-first-out (FIFO) memory device. Although system RAM 32 may be employed in lieu of special purpose video storing means, most the video graphic applications perform better with such special purpose storing means. The portion of primary storage 30 dedicated for storing image data 12 to be displayed on a display device 72 is commonly referred to as a frame buffer 30a. As used herein, primary storage 30 includes some means for storing image data 12 to be displayed on a display device 72. Storage 28 may also include secondary storage 36, such as disk 36a, tape 36b, or CD-ROM 36c based storage media and means for accessing same, such as a disk, tape, or CD-ROM drives, respectively.

The processor 42 includes a primary microprocessor 44, such as an Intel 80386 microprocessor, and may also include a co-processor or display processor, such as an Intel 82786 microprocessor, both manufactured by Intel Corporation of Santa Clara, Calif., or one or more custom built microprocessors. The co-processor 46 typically serves as a display processor which interacts with the primary microprocessor 44 to control the operation of a display device 72. In general, the display processor 46 handles the process of generating pixel information into the frame buffer 30a from an application program. An additional processor, called a display controller 50, may also be employed to handle screen refreshing tasks, if necessary.

The processor 42 interacts with primary storage 30 by requesting and receiving image data 12 input from primary storage 30. Image data 12 stored on secondary storage 36 must first be transferred from secondary storage 36 to primary storage 30 in order for the processor 42 to compress or decompress image data 12.

Image data 12 represents an image to be displayed on a display device 72. Typically, image data 12 is collected by an analog scanning device 70, such as a camera 70a or optical scanner 70b, and input to the apparatus 20 by converting the analog signals to digital signals. The analog-to-digital conversion process results in the creation of a set of numbers representing the shape and various attributes of the image, that is, the image data 12. Image data 12 may also be programmatically generated by a computer program.

In compression mode, the processor 42 requests and receives image data 12 from primary storage 30. The image data 12 may have been transferred under the control of the processor 42 to primary storage 30 from secondary storage 36, from an analog scanning device 70, or by virtue of executing a computer program. The processor 42 includes means 52 for resizing the image data 12 into resized image data 22, and means 54 for compressing the resized image data 22 at least once, thereby creating compressed image data 24.

Figure 3:
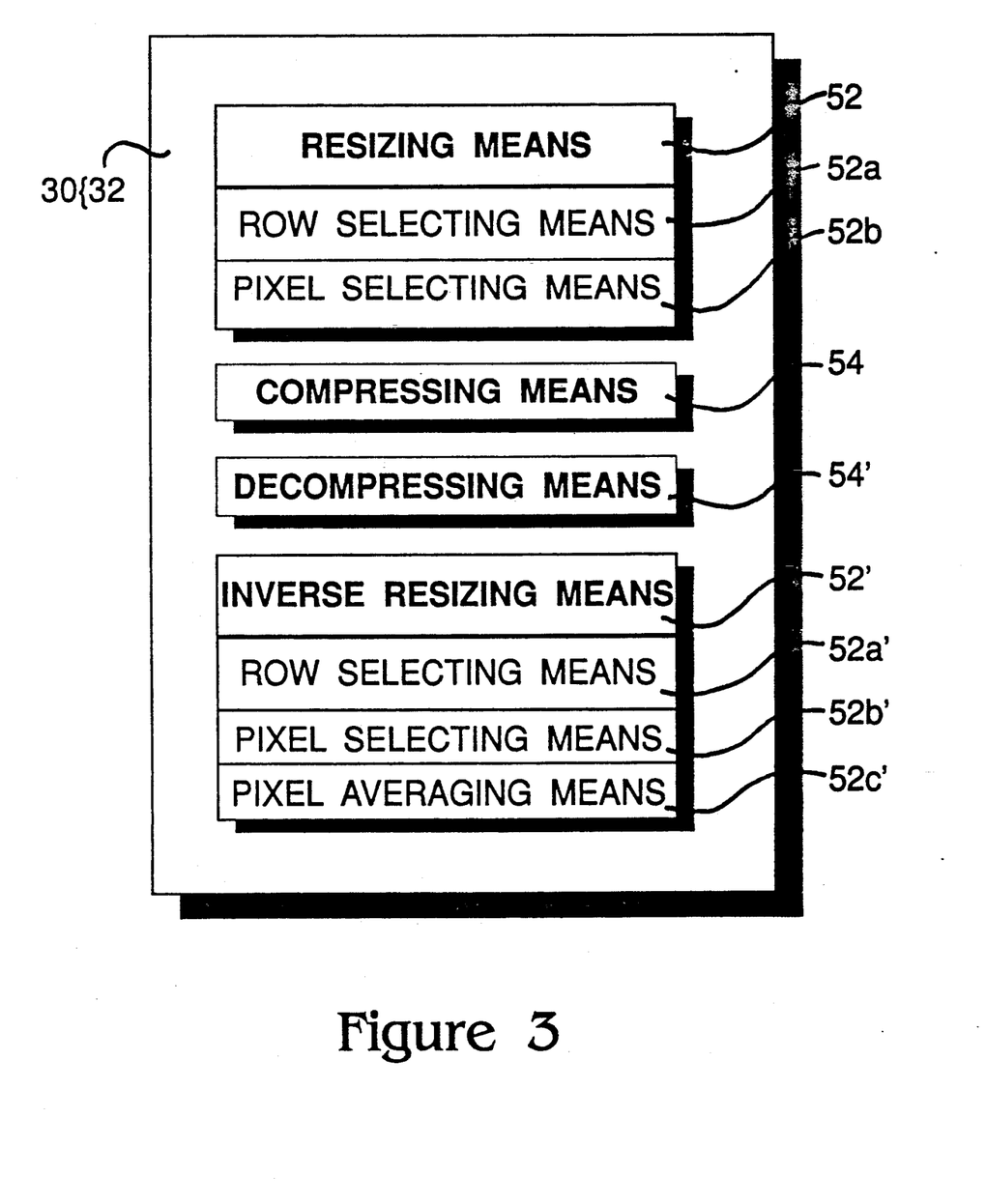
FIG. 3 is a block diagram of resizing, compressing, decompressing, and inverse resizing means, illustrating those components residing within RAM.

Resizing means 52 includes means 52a for selecting at least one row from the image data 12 for inclusion in the resized image data 22, and means 52b for selecting at least one pixel 14 within each selected row for inclusion in the resized image data 22. Resizing means 52 preferably comprises processor instructions stored in primary storage 30, separate and apart from the image data 12, which are accessible and executable by the processor 42. A copy of the instructions are typically stored in secondary storage 36 on computer readable storage media, such as a disk 36a, and transferred to primary storage 30 as required. It is to be understood, however, that resizing means 52 may also be implemented, for example, by designing a dedicated processor to perform the tasks of the resizing means 52, or by storing and executing instructions from ROM 40 as opposed to RAM 32. Details of the instructions for the resizing means 52 are discussed below in connection with the invented method 100.

Figure 2:
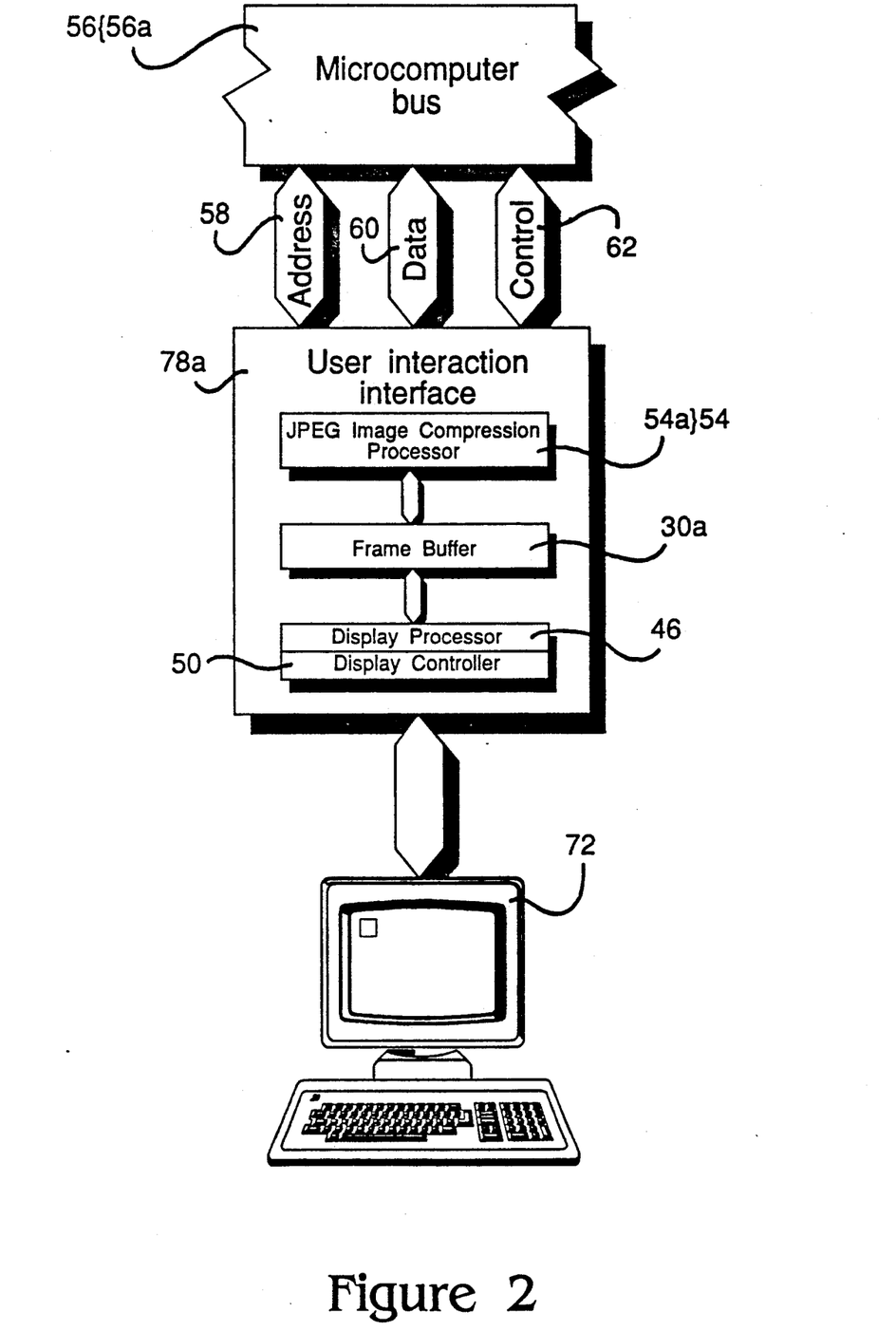
FIG. 2 is an enlarged section of a portion of the flow diagram shown in FIG. 1 illustrating additional components related to display of image data.

Compressing means 54 preferably comprises a mechanism which employs the JPEG Process 54a, such as C-Cube CL550 JPEG Image Compression Processor, although alternative means of compression, such as run length encoding or discrete cosine transformations (including their respective inverse transformations), may also be employed. Compressing means may be implemented in the form of computer hardware, computer software, or computer firmware, or a combination thereof. FIG. 2 depicts the apparatus 10 employing the CL550 Processor 54a. The processor 42 provides the CL550 JPEG image compression processor 54a with resized image data 22 by storing the data in the frame buffer 30a. The CL550 54a, in turn, accesses the frame buffer 30a, compresses the resized image data 22 into compressed image data 24, and provides the resultant data to the microcomputer bus 56a. Typically, the resultant compressed image data 24 is then directed by the processor 42 to be stored in secondary storage 36.

In decompression mode, the processor 42 requests and receives compressed image data 24 from primary storage 30. The compressed image data 24 is typically transferred under the control of the processor 42 to primary storage 30 from secondary storage 36. The processor 42 includes means 54' for decompressing the compressed image data 24 at least once, thereby creating decompressed image data 26, and means 52' for resizing the decompressed image data 26 into inverse resized image data 22'.

As with compressing means 54, decompressing means 54' preferably comprises a mechanism which employs the JPEG Process, such as the CL550 54a'. CL550 54a' performs an inverse operation of that performed by CL550 54. As shown in FIG. 2, the processor 42 provides the CL550 with compressed image data 24 through the microcomputer bus 56a The CL550, in turn, accepts the compressed image data 24, decompresses the compressed image data 24 into decompressed image data 26, and provides the resultant data to the frame buffer 30a.

Inverse resizing means 52' includes means 52a' for selecting at least one row from the decompressed image data 26 for inclusion in the inverse resized image data 22', and means 52b' for selecting at least one pixel 14 within each selected row for inclusion in the inverse resized image data 22'. Inverse resizing means 52' also includes pixel averaging means 52c' discussed below.

Under the control of the processor 42, the inverse resized image data 22' is then transferred to the frame buffer 30a for display on the display device 72, or to secondary storage 36 for later display.

The invented method 100 for compressing image data 12 includes the application of a resizing step 102 to image data 12, in which the image data is typically reduced in size to resized image data 22. The image data and the resized image data are both logically comprised of rows 16 and columns 18 of pixels 14, although both sets of data may in fact be stored sequentially in storage 28. The resized image data 22 is then further compressed by a compression step 106, thereby creating compressed image data 24.

In the preferred embodiment, the compression step 106 employed to create compressed image data 24 conforms to the JPEG Process 54a. In order to restore the image data, or more accurately, an approximation of the image data (i.e., inverse resized image data 22'), the compressed image data 24 is decompressed by applying an appropriate inverse or decompression step 106' for the selected compression step 106. The decompressed image data 26 is then inversely resized to inverse resized image data 22', using a combination of the inverse of the resizing step 102' and a pixel averaging step 104.

Figure 4:
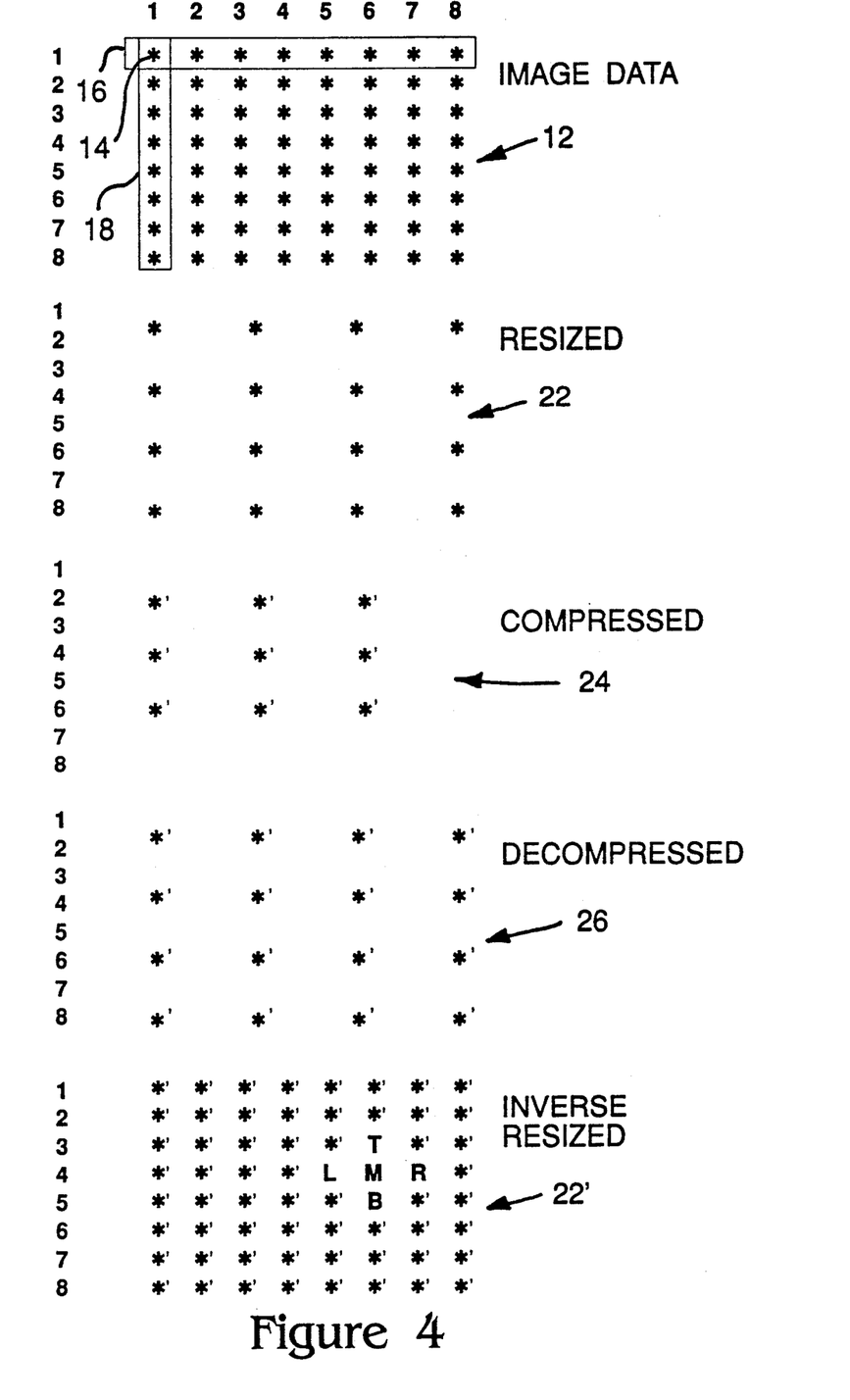
FIG. 4 is an illustration of image data, resized image data, compressed image data, decompressed image data, and inverse resized image data, together with attributes thereof.

Image data 12 is transformed into resized image data 22 by selecting certain rows 16 from the image data 12 for inclusion in the resized image data 22. For each of the rows 16 selected for inclusion in the resized image data 22, certain pixels 14 within the row 16 are selected for inclusion in the resized image data 22. Rows 16 and pixels 14 are selected for inclusion in the resized image data 22 based on a vertical scaling equation VSE and a horizontal scaling equation HSE, respectively, as discussed below.

As previously mentioned, a digital image has a number of characteristics, including a set of pixels 14 comprising a plurality of rows 16 and columns 18, as defined by the total number of row and total number of columns 18a. Each row 16 has a distinct row number. Each pixel 14 within a row 16 has a distinct pixel number corresponding to the column number in which the pixel 14 is located.

Figure 6:
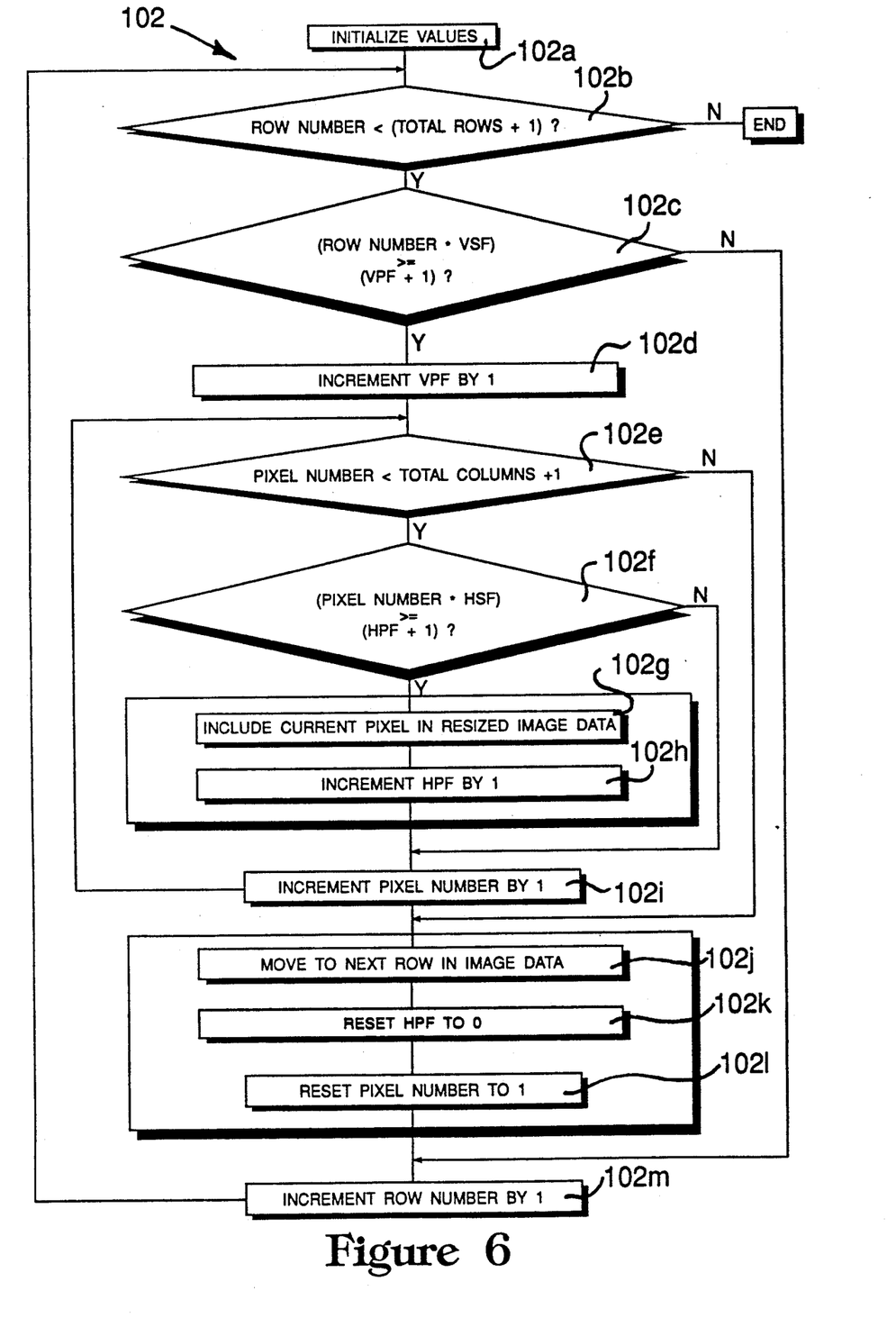
FIG. 6 is a flow diagram of the resizing step employed in connection with the invented method for compressing and decompressing image data.

The degree to which image data 12 is resized into resized image data 22 is defined by setting both a vertical scaling factor VSF and a horizontal scaling factor HSF. The VSF factor is a number which represents the percentage by which the vertical dimension (columns 18) of the image data 12 is to be transformed. The HSF is a number which represents the percentage by which the horizontal dimension (rows 16) of the image data 12 is to be transformed. A scaling factor of less than one represents a size reduction; a factor greater than one represents an enlargement; and a factor equal to one represents no change. During the step 102 of resizing the image data 12, the number of rows selected for inclusion in the resized image data 22, at any particular point in time during the resizing step 102, is referred to as the vertical pixel factor VPF. For each of the rows selected for inclusion in the resized image data 22, the number of pixels, per row, selected for inclusion in the resized image data, is referred to as the horizontal pixel factor HPF.

A preliminary step in the resizing step 102 is to set certain initial values, step 102a. Row number and pixel number 20 are both set to one. HSF and VSF are ordinarily set to desired reduction percentages. HPF and VPF are set to zero.

Resizing image data 12 includes the following steps. First, determine whether the row number is less than the total number of rows plus one, step 102b. If not, terminate the resizing step 102, since there are no more rows to process. If so, determine whether VSE satisfied, step 102c, that is, whether the row number multiplied by the VSF equals or exceeds the VPF plus one, or, alternatively, whether the row number is odd. If the VSE is satisfied, then increment the VPF by one, step 102d, and determine whether the pixel number 20 is less than the total number of columns 18a plus one, step 102e. If so, determine whether the HSE is satisfied, step 102f, that is, whether the pixel number 20 multiplied by the HSF equals or exceeds the HPF plus one, or, alternatively, whether the pixel number 20 is odd. If the HSE is satisfied, then include the pixel currently being processed in the resized image data 22, step 102g, increment both the HPF and the pixel row number by one, steps 102h and 102i, and return to step 102e. If the HSE is not satisfied, then increment the pixel number 20 by one, step 102i, and return to step 102e. If the pixel number 20 is not less than the total number of columns plus one, then move to the next row in the image data 12, step 102j, reset the HPF to zero, step 102k, reset the pixel number 20 to one, step 102l, increment the row number by one, step 102m, and return to step 102b. If the VSE is not satisfied, then increment the row number by one, step 102m, and return to step 102b.

Once the image data 12 has been resized to a (typically) smaller resized image data 22, the resized image data 22 is compressed by applying a compression step 106, thereby creating compressed image data 24. Preferably, the compression step 106 conforms to the JPEG Process, although alternative means of compression, such as run length encoding or discrete cosine transformations, may also be employed. An approximation of image data 12 is obtained by decompressing compressed image data 24 into decompressed image data 26 and resizing the decompressed image data 26 into inverse resized image data 22' using an inverse resizing step 102'.

Figure 7:
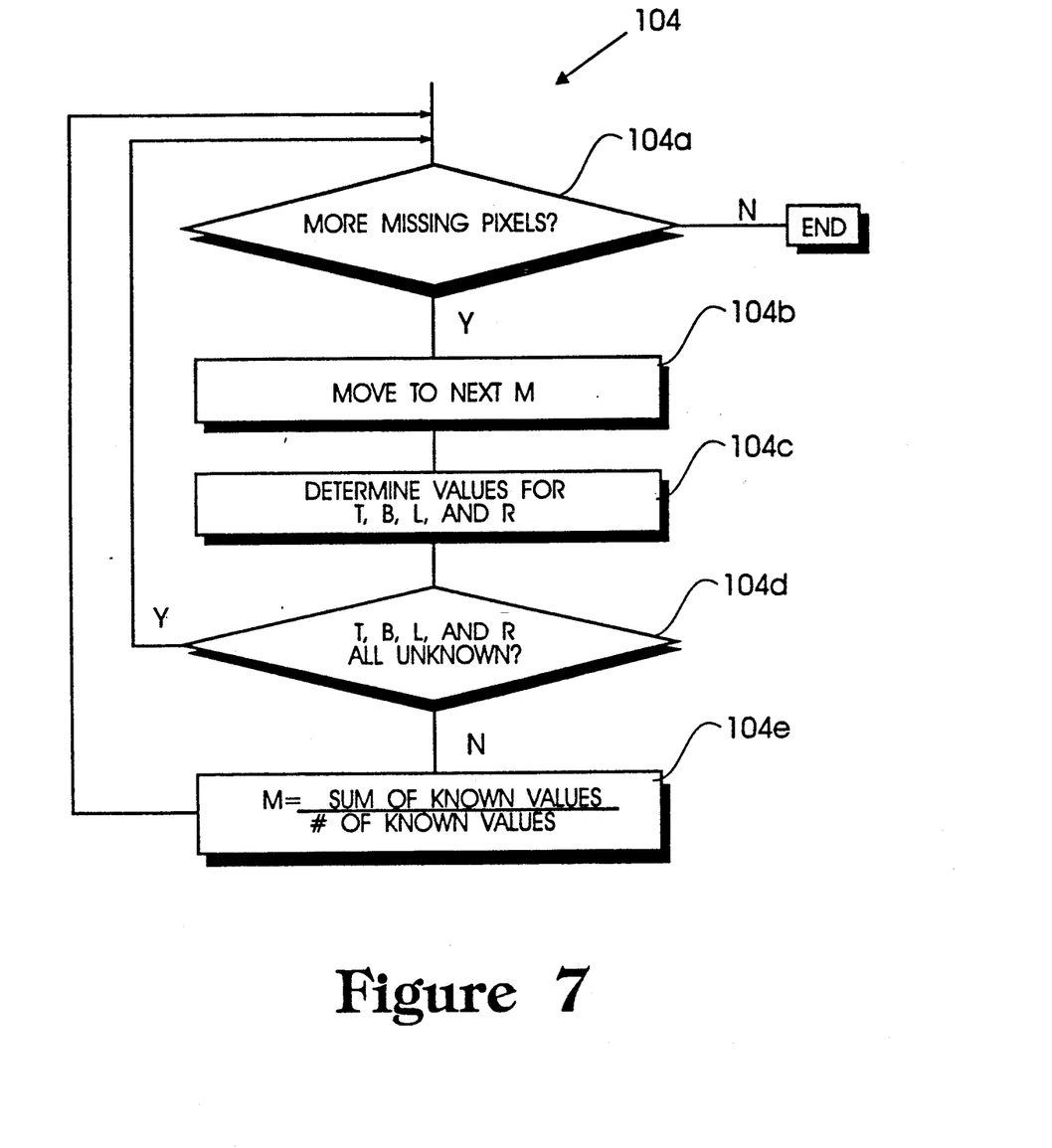
FIG. 7 is a flow diagram of the pixel averaging step employed in connection with the invented method for compressing and decompressing image data.

In addition, a pixel averaging step 104 is preferably employed following the inverse resizing step 102' in order to enhance the image quality of the restored image. Specifically, to "smoothly" resize the image back to its original size, the values of adjacent pixels in the decompressed image data 26 are added to one another and the result is appropriately divided to create an approximation of the intermediate pixel of the resized image data 22'. Since the numerical representation of an image, particularly a color image, does not change abruptly between adjacent pixels, missing pixels may be reconstructed by approximation (i.e., the pixel averaging step 104).

The specific pixel averaging step 104 to be employed will vary depending on the bit size (e.g., 8-bit, 16-bit, or 24-bit) used to represent a pixel 14, whether the pixel represents color attributes, the relative priority between speed of calculation versus quality of image, and the amount of available information with respect to adjacent pixels.

In general, to reconstruct a missing pixel M, the following steps are taken. First, determine whether there are any missing pixels, step 104a. If so, select one of the missing pixels as a candidate, step 104b. Determine the value of the closet pixel directly above T, below B, to the left L, and to the right R of the missing pixel M, step 104c. When selecting the closest pixel if does not matter if the pixel is adjacent only that it be directly in line with the missing pixel. If pixels T, B, L, and R, are all missing, step 104d, then a different missing pixel is selected and the pixel averaging step 104 is restarted. If at least one value for T, B, L, and R is known, then the known values are added together to form a sum and the sum is divided by the number of known values, step 104e. For example, if T=11, B=13, L= unknown, and R=12, then the value of the missing pixel would be $M=(11+13+12)/3=12$. Although a binary representation for pixel values more closely approximates the way in which pixel values are physically stored, the pixel values referred to herein are in decimal representation for purposes of readability. It is understood by those skilled in the art that for any given decimal representation of a number (e.g., T=11), there is an equivalent binary representation (e.g., T=1011).

As discussed above, variations of the pixel averaging step 104 may be employed depending upon certain factors. The general method places the emphasis on quality of image and attempts to utilize all known information in the computation of the missing pixel. If speed of calculation is to be emphasized over quality of image (e.g., in a motion video image compression/decompression application), then an alternative is to utilize only a subset of the known values in the averaging calculation. Thus, for example, only T and B (or only L and R) may be selected for the purpose of computing the missing pixel ( e.g., $M=(11+13)/2=12$, where T=11 and B=13).

The bit size of a pixel 14 varies depending upon the information intended to be represented by the pixel. Currently, three common bit sizes for pixels are 8-bit, 16-bit, and 24-bit. 8-bit pixels are typically employed in connection with monochrome display of images. 16-bit and 24-bit pixels are employed in connection with color display of images. A 16-bit pixel represents color attributes by allocating 5 bits for red hues R, 5 bits for green hues G, 5 bits for blue hues B, and 1 bit for overlay purposes. The notion of overlays will not be further discussed. The 15 bits employed to represent the color attribute of a pixel enable up to $2^{15}$ colors to be represented. A 24-bit pixel functions in an analogous manner, however 8 bits apiece are allocated for R, G, and B hues, and a total of $2^{24}$ colors may be represented In order to determine the value of a missing 16-bit or 24-bit pixel, the averaging method treats R, G, B values separately. Each missing R, G, and B component of a missing pixel, M, is computed separately based on the values of their respective neighboring R, G, and B components. The following example, which assumes 24-bit pixels, illustrates the resizing and pixel averaging steps 102, 104 of the method 100.

Table 1 illustrates a 5×5 matrix of 24-bit pixels as it would appear after digitization of a visual image and prior to any resizing or compression. The pixel values are representative of a very small portion of a blue sky and may be considered as a subset of an 8×8 JPEG block.

TABLE 1

| ROW | COLUMN |||||||||||||||
|---|---|---|---|---|---|---|---|---|---|---|---|---|---|---|---|
| | 1 ||| 2 ||| 3 ||| 4 ||| 5 |||
| | R | G | B | R | G | B | R | G | B | R | G | B | R | G | B |
| 1 | 14 | 18 | 18 | 12 | 17 | 16 | 11 | 16 | 16 | 13 | 17 | 15 | 12 | 16 | 15 |
| 2 | 12 | 15 | 16 | 11 | 19 | 15 | 13 | 19 | 14 | 14 | 18 | 16 | 12 | 16 | 14 |
| 3 | 13 | 19 | 19 | 13 | 19 | 15 | 14 | 18 | 18 | 12 | 17 | 17 | 13 | 14 | 18 |
| 4 | 12 | 15 | 18 | 15 | 17 | 16 | 15 | 18 | 18 | 12 | 20 | 19 | 16 | 18 | 17 |
| 5 | 13 | 19 | 19 | 15 | 16 | 16 | 14 | 16 | 18 | 12 | 15 | 16 | 14 | 17 | 16 |

The results of applying the resizing step 102 to the image data 12 in Table 1, with HSF and VSF equal to 0.6, is known in Table 2.

TABLE 2

| ROW | COLUMN |||||||||||||||
|---|---|---|---|---|---|---|---|---|---|---|---|---|---|---|---|
| | 1 ||| 2 ||| 3 ||| 4 ||| 5 |||
| | R | G | B | R | G | B | R | G | B | R | G | B | R | G | B |
| 1 | | | | | | | | | | | | | | | |
| 2 | | | | 11 | 19 | 15 | | | | 14 | 18 | 16 | 12 | 16 | 14 |
| 3 | | | | | | | | | | | | | | | |
| 4 | | | | 15 | 17 | 16 | | | | 12 | 20 | 19 | 16 | 18 | 17 |
| 5 | | | | 15 | 16 | 16 | | | | 12 | 15 | 16 | 14 | 17 | 16 |

The results of applying the pixel averaging step 104 to the data in Table 2 is shown in Table 3. The indices shown in connection with some of the pixels indicate one order in which the missing pixels may be determined. The order depicted in Table 3 illustrates a pattern whereby the top row (row 1) is derived by first determining all the values in row 2. Once the missing pixel values for the top row are determined, the missing pixel values for the bottom row are then determined. The process continues thereafter in a to bottom and left to right manner. It should be understood, however, that the order shown is not the only possible order in which the missing pixels may be determined. Any order which results in the determination of all missing pixel is acceptable.

TABLE 3

| ROW | COLUMN |||||||||||||||
|---|---|---|---|---|---|---|---|---|---|---|---|---|---|---|---|
| | 1 ||| 2 ||| 3 ||| 4 ||| 5 |||
| | R | G | B | R | G | B | R | G | B | R | G | B | R | G | B |
| 1 | $^3$11 | 19 | 15 | $^4$11 | 19 | 15 | $^5$12 | 18 | 15 | $^6$14 | 18 | 16 | $^7$12 | 16 | 14 |
| 2 | $^1$11 | 19 | 15 | 11 | 19 | 15 | $^2$12 | 18 | 15 | 14 | 18 | 16 | 12 | 16 | 14 |
| 3 | $^{12}$13 | 17 | 15 | $^{13}$13 | 17 | 15 | $^{14}$12 | 17 | 15 | $^{15}$12 | 18 | 16 | $^{16}$13 | 17 | 15 |
| 4 | $^{10}$15 | 16 | 16 | 15 | 17 | 16 | $^{11}$13 | 17 | 17 | 12 | 20 | 19 | 16 | 18 | 17 |

TABLE 3-continued

| | COLUMN | | | | | | | | | | | | | | |
|---|---|---|---|---|---|---|---|---|---|---|---|---|---|---|---|
| | 1 | | | 2 | | | 3 | | | 4 | | | 5 | | |
| ROW | R | G | B | R | G | B | R | G | B | R | G | B | R | G | B |
| 5 | ⁸15 | 16 | 16 | 15 | 16 | 16 | ⁹13 | 15 | 16 | 12 | 15 | 16 | 14 | 17 | 16 |

The invention also includes an article of manufacture, namely, a computer program product having a computer readable medium having computer program logic recorded thereon for compressing image data having rows and columns of pixels.

Figure 8:
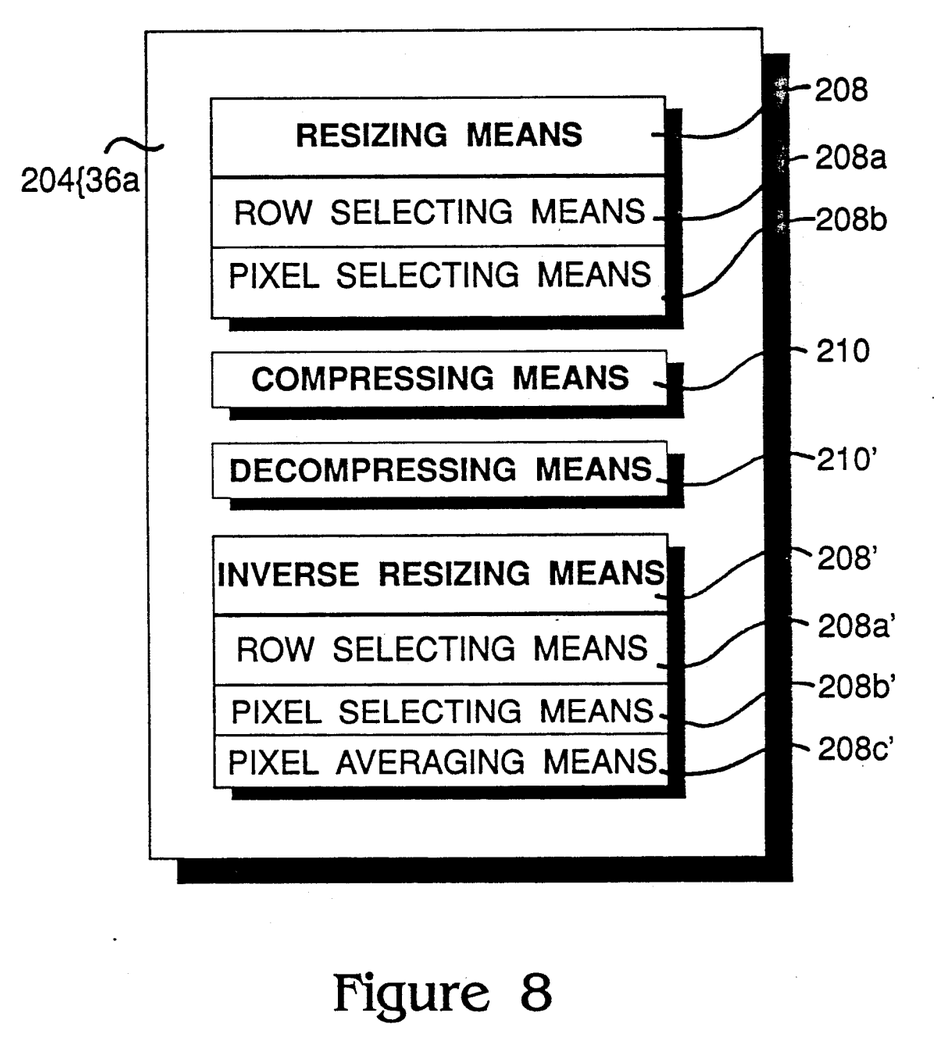
FIG. 8 is a block diagram illustrating the invented computer program product.

The computer program product includes thereon means for compressing and decompressing image data. Compressing means 206 includes (a) means for resizing the image data into resized image data which includes (i) means for choosing at least one row from the image data for inclusion in the resized image data; and (ii) means for choosing at least one pixel within each chosen row for inclusion in the resized image data; and (b) means 210 for compressing the resized image data at least once, thereby creating compressed image data. Decompressing means includes (a) means for decompressing the compressed image data at least once, thereby creating decompressed image data; and (b) means for resizing the decompressed image into inverse resized image data which includes (i) means for choosing at least one row from the decompressed image data for inclusion in the inverse resized image data; and (ii) means for choosing at least one pixel within each chosen row for inclusion in the inverse resized image data. Compressing and decompressing means operate in the manner described by the invented method.

It is to be understood that inclusive within the resizing step is the process of (1) choosing alternating rows of image data for inclusion in the resized image data without choosing any pixels within the chosen row, or (2) choosing alternating columns of image data for inclusion in the resized image data without excluding any rows. These implementations of the resizing steps significantly decrease the time required to perform the resizing step and are particularly useful in connection with motion video imaging applications.

SUMMARY OF THE ACHIEVEMENT OF THE OBJECTS OF THE INVENTION

From the foregoing, it is readily apparent that I have invented an improved method, apparatus, and article of manufacture, directed to compressing and decompressing image data, which is an improvement to the JPEG Process, for compressing an image to a smaller file size which does not result in unacceptable degradation of the decompressed image, which can then be electronically stored, and/or transmitted to remote locations, which may be employed with either still frame images or motion video images, and which may be employed in lieu of dedicated computer hardware components, in a more efficient and less expensive manner than heretofore available.

It is to be understood that the foregoing description and specific embodiments are merely illustrative of the best mode of the invention and the principles thereof, and that various modifications and additions may be made to the method and apparatus by those skilled in the art, without departing from the spirit and scope of this invention, which is therefore understood to be limited only by the scope of the appended claims.

I claim:

1. Apparatus for compressing digital image data having rows and columns of pixels, comprising:
   (a) means for storing the image data;
   (b) means for processing the image data which includes:
      (i) means for resizing the image data into resized image data which includes:
         means for selecting at least one row from the image data for inclusion in the resized image data; and
         means for selecting at least one pixel within each selected row for inclusion in the resized image data; and
      (ii) means for compressing the resized image data at least once, to create compressed image data; and
   (c) means for communicating information between said storing means and said processing means.

2. Apparatus according to claim 1, wherein said storing means includes a random access memory device for storing said image data.

3. Apparatus according to claim 1, wherein said storing means includes a special purpose video random access memory device for storing said image data.

4. Apparatus according to claim 1, wherein said storing means includes a bi-directional first-in-first-out memory device for storing said image data.

5. Apparatus according to claim 1, wherein said processing means includes a primary microprocessor and a co-processor, the primary microprocessor and the co-processor being operably connected to one another to control the operation of a display device.

6. Apparatus according to claim 1, wherein said resizing means comprises processor instructions stored in said storing means, which instructions are accessible and executable by said processing means.

7. Apparatus according to claim 1, wherein said compressing means comprises a C-Cube CL550 JPEG Image Compression Processor operably connected to both said processing means and said storing means for compressing image data stored in said storing means.

8. Apparatus according to claim 1, wherein said compressing means comprises run length encoding compression means.

9. Apparatus according to claim 1, wherein said compressing means comprises discrete cosine transformation compression means.

10. Apparatus for decompressing compressed digital image data having rows and columns of pixels, comprising:
   (a) means for storing the compressed image data;
   (b) means for processing the compressed image data which includes:
      (i) means for decompressing the compressed image data at least once, thereby creating decompressed image data, and
      (ii) means for resizing the decompressed image data into inverse resized image data which includes:

means for selecting at least one row from the decompressed image data for inclusion in the inverse resized image data; and means for selecting at least one pixel within each selected row for inclusion in the inverse resized image data; and (c) means for communicating information between said storing means and said processing means.

11. Apparatus according to claim 10, wherein said storing means includes a random access memory device for storing said image data.

12. Apparatus according to claim 10, wherein said storing means includes a special purpose video random access memory device for storing said image data.

13. Apparatus according to claim 10, wherein said storing means includes a bi-directional first-in-first-out memory device for storing said image data.

14. Apparatus according to claim 10, wherein said processing means includes a primary microprocessor and a co-processor, the primary microprocessor and the co-processor being operably connected to one another to control the operation of a display device.

15. Apparatus according to claim 10, wherein said inverse resizing means comprises processor instructions stored in said storing means, which instructions are accessible and executable by said processing means.

16. Apparatus according to claim 10, wherein said decompressing means comprises a C-Cube CL550 JPEG Image Compression Processor operably connected to both said processing means and said storing means for decompressing image data stored in said storing means.

17. Apparatus according to claim 10, wherein said decompressing means comprises run length encoding decompression means.

18. Apparatus according to claim 10, wherein said decompressing means comprises discrete cosine transformation decompression means.

19. Apparatus according to claim 10, wherein said inverse resizing means includes means for pixel averaging.

20. Method for compressing digital image data having rows and columns of pixels, comprising the steps of:
(a) storing the image data;
(b) processing the image data which includes
  (i) resizing the image data into resized image data which includes:
    selecting at least one row from the image data for inclusion in the resized image data; and
    selecting at least one pixel within each selected row for inclusion in the resized image data; and
  (ii) compressing the resized image data at least once, thereby creating compressed image data.

21. Method according to claim 20, wherein step (b)(ii) conforms to JPEG Process.

22. Method according to claim 20, wherein step (b)(i) includes selecting each odd numbered row for inclusion in the resized image data.

23. Method according to claim 20, wherein step (b)(i) includes selecting each odd numbered pixel within the row for inclusion in the resized image data.

24. Method according to claim 20, wherein step (b) (i) includes:
(a) initializing certain variables with preselected values, said preselected variables including fields identifying row number, total number of rows, vertical scaling factor, vertical pixel factor, pixel number, total number of columns, horizontal scaling factor, and horizontal pixel factor;
(b) if the row number is less than the total number of rows plus one, proceeding with step (c), otherwise, terminating step (b) (i) of claim 20;
(c) if the row number multiplied by the vertical scaling factor equals or exceeds the vertical pixel factor plus one, proceeding with step (d), otherwise, proceeding with step (m);
(d) incrementing the vertical pixel factor by one;
(e) if the pixel number is less that the total number of columns plus one, proceeding with step (f), otherwise, proceeding with step (j);
(f) if the pixel number multiplied by the horizontal scaling factor equal or exceeds the horizontal pixel factor plus one, proceeding with step (g), otherwise, proceeding with step (i);
(g) including the pixel currently being processed into the resized image data;
(h) incrementing the horizontal pixel factor by one;
(i) incrementing the pixel number by one and proceeding with step (e);
(j) moving to the next row of the resized image data;
(k) resetting the horizontal pixel factor to zero;
(l) resetting the pixel number to one; and
(m) incrementing the row number by one and proceeding with step (a).

25. Method for decompressing compressed digital image data having rows and columns of pixels, comprising the steps of:
(a) storing the compressed image data;
(b) processing the compressed image data which includes
  (i) decompressing the compressed image data at least once, thereby creating decompressed image data, and
  (ii) resizing the decompressed image data into inverse resized image data which includes:
    selecting at least one row from the decompressed image data for inclusion in the inverse resized image data; and
    selecting at least one pixel within each selected row for inclusion in the inverse resized image data.

26. Method according to claim 25, wherein step (b)(ii) includes reconstructing a missing pixel M, by performing the following steps for all missing pixels:
(a) determining the value of the next pixel directly above T, below B, to the left L, and to the right R of the missing pixel M;
(b) if pixels T, B, L, and R, are all missing, then selecting a different missing pixel and restarting step (a); and
(c) if at least one value for T, B, L, and R is known, then adding the known values together to form a sum and dividing the sum by the number of known values to form an approximation of the missing pixel.

27. Method according to claim 26, wherein only a subset of the known values are employed in the averaging calculation of step (c).

28. Method according to claim 26, wherein a pixel is comprised of an 8-bit red attribute component, an 8-bit green attribute component, and an 8-bit blue attribute component, to form a 24-bit pixel, and each missing 8-bit component of a missing pixel, M, is computed separately based on the values of their respective neighboring 8-bit components.

29. A computer program product having a computer readable medium having computer program logic recorded thereon for compressing digital image data having rows and columns of pixels, comprising:
(a) means for resizing the image data into resized image data which includes:
   (i) means for selecting at least one row from the image data for inclusion in the resized image data; and
   (ii) means for selecting at least one pixel within each selected row for inclusion in the resized image data; and
(b) means for compressing the resized image data at least once, thereby creating compressed image data.

30. A computer program product having a computer readable medium having computer program logic recorded thereon for decompressing compressed digital image data having rows and columns of pixels, comprising:
(a) means for decompressing the compressed image data at least once, thereby creating decompressed image data; and
(b) means for resizing the decompressed image data into inverse resized image data which includes:
   (i) means for selecting at least one row from the decompressed image data for inclusion in the inverse resized image data; and
   (ii) means for selecting at least one pixel within each selected row for inclusion in the inverse resized image data.

* * * * *